US007693154B2

(12) United States Patent
Gotoh et al.

(10) Patent No.: US 7,693,154 B2
(45) Date of Patent: Apr. 6, 2010

(54) TRANSMITTER AND METHOD OF TRANSMISSION

(75) Inventors: Tomonori Gotoh, Kawasaki (JP);
Katsumi Tanaka, Kawasaki (JP);
Hiroaki Nagao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1086 days.

(21) Appl. No.: 10/695,474

(22) Filed: Oct. 28, 2003

(65) Prior Publication Data
US 2004/0085966 A1 May 6, 2004

(30) Foreign Application Priority Data
Oct. 29, 2002 (JP) .............................. 2002-314179

(51) Int. Cl.
*H04L 12/28* (2006.01)
(52) U.S. Cl. .................................. 370/395.31; 370/401
(58) Field of Classification Search ............ 370/395.31, 370/401; 709/223, 238, 242
See application file for complete search history.

(56) References Cited

U.S. PATENT DOCUMENTS

| 5,408,469 | A * | 4/1995 | Opher et al. ................. 370/399 |
| 6,298,062 | B1 * | 10/2001 | Gardell et al. ............... 370/401 |
| 6,650,639 | B2 * | 11/2003 | Doherty et al. .............. 370/389 |
| 6,665,297 | B1 * | 12/2003 | Hariguchi et al. ........... 370/392 |
| 6,717,944 | B1 * | 4/2004 | Bryden et al. ............... 370/392 |
| 6,859,842 | B1 | 2/2005 | Nakamichi et al. |
| 2001/0008528 | A1 | 7/2001 | Suzuki |
| 2002/0087730 | A1 * | 7/2002 | Yonekura .................... 709/247 |
| 2002/0097676 | A1 * | 7/2002 | Matsumaru ................. 370/230 |
| 2002/0114333 | A1 * | 8/2002 | Xu et al. ...................... 370/392 |
| 2003/0118021 | A1 * | 6/2003 | Donoghue et al. .......... 370/392 |
| 2004/0076154 | A1 * | 4/2004 | Mizutani et al. ............ 370/389 |
| 2004/0085966 | A1 * | 5/2004 | Gotoh et al. ........... 370/395.31 |

FOREIGN PATENT DOCUMENTS

| JP | 9-186715 | 7/1997 |
| JP | 2000-295274 | 10/2000 |
| JP | 2001-144804 | 5/2001 |
| JP | 2001-203739 | 7/2001 |

OTHER PUBLICATIONS

Kuo-Hsing Cheng, et al. The Improvement of Conditional Sum Adder for Low Power Applications/ 1998 IEEE pp. 131-134.
Notification of Reasons for Rejection mailed Nov. 21, 2006.
Toru Takahashi, et al. "Internetworking Device between Local Area Network" Furukawa Electric Review, vol. 92, pp. 75-82, Jun. 1993.

* cited by examiner

*Primary Examiner*—Gregory B Sefcheck
*Assistant Examiner*—Salvador E Rivas
(74) *Attorney, Agent, or Firm*—Katten Muchin Rosenman LLP

(57) ABSTRACT

A transmitter equipped with a plurality of transmission path ports and a relay section. The relay section has a routing table and a router. In the routing table, information about the relay of the received packet to one of the transmission path ports connected to a relay transmission path is stored, correlated with both a port identifier of each the transmission path port and the source address of the transmitter that transmitted the packet. The router extracts the port identifier of the transmission path port that received the packet and the source address contained in the received packet, and routes the received packet to the transmission path port connected to the relay transmission path by referring to the routing table for the extracted port identifier and the extracted source address.

5 Claims, 17 Drawing Sheets

FIG. 3

| RECEIVING PORT | | RELAY | COMPARISON WITH EXTRACTED SA |
|---|---|---|---|
| TRANSMISSION PATH PORT 10 | | ○ | TRANSMITTERS 61-1~61-n |
| | | × | TRANSMITTERS 62-1~62-4,63-1,63-2 |
| TRANSMISSION PATH PORT 20 | | ○ | TRANSMITTERS 62-2~62-4,63-1,63-2 |
| | | × | TRANSMITTERS 61-1~61-n,62-1 |
| TRANSMISSION PATH PORT 30 | | ○ | TRANSMITTERS 62-2~62-4,63-1,63-2 |
| | | × | TRANSMITTERS 61-1~61-n,62-1 |

FIG. 5

| RECEIVING PORT | RELAY | COMPARISON WITH EXTRACTED SA |
|---|---|---|
| TRANSMISSION PATH PORT 10 | O | TRANSMITTERS 61-1~61-n,62-1~62-3 |
| TRANSMISSION PATH PORT 10 | × | TRANSMITTERS 62-4,63-1,63-2 |
| TRANSMISSION PATH PORT 20 | O | TRANSMITTERS 61-1~61-n,62-1~62-3 |
| TRANSMISSION PATH PORT 20 | × | TRANSMITTERS 62-4,63-1,63-2 |
| TRANSMISSION PATH PORT 30 | O | TRANSMITTERS 63-1,63-2 |
| TRANSMISSION PATH PORT 30 | × | TRANSMITTERS 61-1~61-n,62-1~62-4 |

FIG. 7

| RECEIVING PORT | RELAY | COMPARISON WITH EXTRACTED SA |
|---|---|---|
| TRANSMISSION PATH PORT 10 | ○ | OTHER THAN A SELF-TRANSMITTER |
| | × | SELF-TRANSMITTER |
| TRANSMISSION PATH PORT 20 | ○ | OTHER THAN A SELF-TRANSMITTER |
| | × | SELF-TRANSMITTER |
| TRANSMISSION PATH PORT 30 | ○ | OTHER THAN A SELF-TRANSMITTER |
| | × | SELF-TRANSMITTER |

FIG. 9

ROUTING INFORMATION FOR TRANSMITTER 67

| RECEIVING PORT | TRANSMITTING PORT | RELAY | COMPARISON WITH EXTRACTED DA | COMPARISON WITH EXTRACTED SA |
|---|---|---|---|---|
| TRANSMISSION PATH PORT 10 | TRANSMISSION PATH PORT 20 | ○ | TRANSMITTER 69 | TRANSMITTER 65-1 |
| TRANSMISSION PATH PORT 10 | TRANSMISSION PATH PORT 20 | × | TRANSMITTER 69 | TRANSMITTER 65-2 |
| TRANSMISSION PATH PORT 10 | TRANSMISSION PATH PORT 30 | ○ | TRANSMITTER 69 | TRANSMITTER 65-2 |
| TRANSMISSION PATH PORT 10 | TRANSMISSION PATH PORT 30 | × | TRANSMITTER 69 | TRANSMITTER 65-1 |

FIG. 10(a)

| RECEIVING PORT | TRANSMITTING PORT | RELAY | COMPARISON WITH EXTRACTED DA | COMPARISON WITH EXTRACTED SA | |
|---|---|---|---|---|---|
| TRANSMISSION PATH PORT 10 | TRANSMISSION PATH PORT 20 | ○ | TRANSMITTER m1 | TRANSMITTER s1 | SETTINGS TAKING DA/SA/TRANSMITTING PORT/ RECEIVING PORT INTO CONSIDERATION |
| TRANSMISSION PATH PORT 10 | TRANSMISSION PATH PORT 20 | × | TRANSMITTER m2 | TRANSMITTER s1 | |

FIG. 10(b)

| RECEIVING PORT | 送信ポート | RELAY | COMPARISON WITH EXTRACTED DA | 抽出したSAと比較 | |
|---|---|---|---|---|---|
| TRANSMISSION PATH PORT 10 | DON'T CARE | ○ | TRANSMITTER m1 | TRANSMITTER s1 | TAKE DA/SA/TRANSMITTING PORT/RECEIVING PORT INTO CONSIDERATION AND TRANSMIT DATA TO ALL PORTS |
| TRANSMISSION PATH PORT 10 | DON'T CARE | × | TRANSMITTER m2 | TRANSMITTER s1 | |

TRANSMITTER AND METHOD OF TRANSMISSION

BACKGROUND OF THE INVENTION

1) Field of the Invention

The present invention relates to transmitters and a method of transmission that are used in a network where data packets are transferred between a source transmitter and a destination transmitter via a relay transmitter, and relates more particularly to transmitters and a transmission method that are suitably employed in a vast and complex network where data transmission between certain points is performed via a redundant path structure (consisting of a plurality of paths) to ensure reliability.

2) Description of the Related Art

In networks, in which transmission path ports in transmitters are connected through transmission paths such as optical fiber paths, data communications is performed between transmitters.

In a first method of transmission, it is judged whether a data packet received by one transmission path port in a transmitter is relayed to another transmission path port which relays the received data packet to its destination, and based on the result of judgement, the received data packet is relayed from the receiving port to the relay port. In a second method of transmission, a transmission path port to relay a data packet is determined by referring to a routing table, based on a destination address contained in the header of a data packet.

A conventional transmitter adopting the above-described first transmission method is shown in FIG. 12 by way of example. The conventional transmitter is typically configured to include receiving port sections 111, 121, 131, 141, transmitting port sections 112, 122, 132, 142, and a relay section 150.

The receiving port sections 111, 121, 131, and 141 consist of O/E (Optical/Electrical) converters 113, 123, 133, 143, reception controllers 114, 124, 134, 144, and first-in first-out (FIFO) memories 115, 125, 135, 145, respectively. The transmitting port sections 112, 122, 132, and 142 consist of transmission controllers 116, 126, 136, 146, FIFO memories 117, 127, 137, 147, and E/O converters 118, 128, 138, 148, respectively.

The relay section 150 consists of relay units 151 to 154, which relay packets received via the receiving port sections 111, 121, 131, and 141. The relay units 151 to 154 store the connection status of the transmitting port sections 112, 122, 132, and 142 to which a received packet is transmitted from the receiving port sections 111, 121, 131, and 141. This makes it possible to relay a packet received via the receiving ports 111, 121, 131, or 141 to a relay transmitter from which the received packet reaches its destination (destination transmitter).

For example, in the case where transmitters 1-1 to 1-n (where n is an integer≧3), 2-1 to 2-4, 3-1, and 3-2 such as the one shown in FIG. 12 are arranged as shown in FIG. 13 and construct a network 4, packets are transmitted within the network 4 by the above-described first transmission method. In the relay units 151 to 154 of the relay section 150 in each of the transmitters 1-1 to 1-n, 2-1 to 2-4, 3-1, and 3-2, relay methods in the transmitting and receiving port sections 111, 121, 131, 141, 112, 122, 132, and 142 are set.

The network 4 consists of three network portions, depending on the form of connection of transmitters. The first network portion 1 consists of transmitters 1-1 to 1-n connected in tandem, the second network portion 2 consists of transmitters 2-1 to 2-4 connected in ring form, and the third network portion 3 consists of transmitters 3-1 and 3-2 connected in tandem. The transmitter 1-n and the transmitter 2-1 are connected to each other, so the first network portion 1 and the second network portion 2 are connected to each other. The transmitter 2-4 and the transmitter 3-1 are connected to each other, so the second network portion 2 and the third network portion 3 are connected to each other.

The transmitter 2-1 is constructed so packets can be relayed according to settings shown in FIG. 14 by the relay units 151 to 154 of the relay section 150. Note in the figure that the transmission path ports 110, 120, 130, and 140 of the transmitter 2-1 are provided with transmitting and receiving port sections 112 and 111, transmitting and receiving port sections 122 and 121, transmitting and receiving port sections 132 and 131, and transmitting and receiving port sections 142 and 141 (see FIG. 12).

More specifically, the first transmission path port 110 is provided with the receiving port section 111 for receiving packets from the transmitters 1-n, and the transmitting port section 112 for transmitting packets to those transmitters 1-n. Similarly, the second transmission path port 120 is provided with the transmitting port section 122 and receiving port section 121 for transmitting and receiving packets to and from the transmitter 2-2. The third transmission path port 130 is provided with the transmitting port section 132 and receiving port section 131 for transmitting and receiving packets to and from the transmitter 2-4.

In the network 4 shown in FIG. 13, in order to perform communications from the transmitter 2-4 to the transmitter 2-2, in the relay transmitter 2-1 data packet received from the transmission path port 130 is relayed to the transmission path port 120. To perform communications from the transmitter 2-4 to the transmitters 1-1 to 1-n, the data packet from the transmission path port 130 is also relayed to the transmission path port 110. In other words, the data packet received by the receiving port section 131 of the transmission path port 130 is copied in the relay unit 153 of the transmitter 2-1 and relayed to the transmitters 1-1 to 1-n and to the transmitter 2-2.

Likewise, to perform communications from the transmitter 2-2 to the transmitter 2-4, a data packet received from the transmission path port 120 is relayed to the transmission path port 130. To perform communications from the transmitter 2-2 to the transmitters 1-1 to 1-n, the data packet from the transmission path port 120 is also relayed to the transmission path port 110. In other words, the data packet received by the receiving port section 121 of the transmission path port 120 is copied in the relay unit 152 and relayed to the transmitters 1-1 to 1-n and transmitter 2-4.

In addition, to perform communications from the transmitters 1-1 to 1-n to the transmitter 2-2, a data packet received from the transmission path port 110 is relayed to the transmission path port 120. To perform communications from the transmitters 1-1 to 1-n to the transmitter 2-4, the data packet from the transmission path port 110 is also relayed to the transmission path port 130. In other words, the data packet received by the receiving port section 111 of the transmission path port 110 is copied in the relay unit 151 and relayed to the transmitter 2-4.

Another conventional transmitter adopting the above-described second transmission method is shown in FIG. 15. The transmitter, as with the transmitter shown in FIG. 12, includes receiving port sections 111, 121, 131, 141, transmitting port sections 112, 122, 132, 142, and a relay section 160.

Unlike the case of FIG. 12, the relay section 160 consists of a routing processing section 170 and a table register 180. The routing processing section 170 is equipped with a receiving part 171, a destination address extracting part 172, a judging part 173, and four transmitting parts 174 to 177. The table register 180 dynamically or statically stores a transmitting port number for relaying data for each destination address.

More specifically, in the routing processing section 170 of the transmitter adopting the second transmission method shown in FIG. 15, the destination address extracting part 172 extracts a destination transmitter address (destination address, DA) from the header of a data packet received by each of the receiving port sections 111, 121, 131, and 141. The judging part 173 extracts the number of the transmitting port section 112, 122, 132, or 142 connected with a destination transmitter, by referring to the statically or dynamically set table register 180. The judging part 173 further commands the transmitting parts 174, 175, 176, and 177 connected with the extracted transmitting port sections 112, 122, 132, and 142 to transfer data packets received by the receiving part 171.

For instance, in a network 4A with transmitters 5-1, 5-2, 6, 7, 8-1, 8-2, and 9 connected as shown in FIG. 16, when packets are transmitted by the above-described second transmission method, each of the transmitters 5-1, 5-2, 6, 7, 8-1, 8-2, and 9 is constructed as shown in FIG. 15.

Note that the network 4A has a redundant transmission path structure between the transmitters 7 and 9, which consists two routes. In the first route, packets are relayed to the transmitter 8-1 connected to the transmission path port 140. In the second route, packets are relayed to the transmitter 8-2 connected to the transmission path port 130.

In the relay transmitter 7, a data packet is relayed according to settings shown in FIG. 17 by the routing processing section 170 of the relay section 160. That is, a destination address (DA) in the header of a data packet (DP), received by the receiving port section 111 of the transmission path port 110 (see FIG. 15), is extracted by the destination address extracting part 172. When the extracted destination address is the address of the transmitter 9, that data packet DP is transferred to the transmission path port 140. In this way, the data packet DP received by the transmitter 7 is transferred to the transmitter 9 via the transmitter 8-1.

Note that in order to construct a virtual local area network (VLAN), conventional network frame relay units store information about the corresponding relationship between the address of a terminal in the destination of a network frame and a port connected to that terminal, and also store information about the corresponding relationship between the address of a terminal in the source of a network frame and a port connected to a terminal in the destination of a network frame transmitted from the address of that source terminal (see Japanese Laid-Open Patent Publication No. HEI 9-186715).

In addition, in conventional packet switches, if a packet is received, an IP flow table is searched for the IP source address and IP destination address of that packet in order to reduce microprocessor's routing load and security load. If the IP flow table has a corresponding IP flow, the packet is transferred to an appropriate output port according to the routing process shown in the IP flow without being routed by a microprocessor (see Japanese Laid-Open Patent Publication No. 2000-295274).

However, the network 4 shown in FIG. 13 has the following problems when transmitting data packets by the aforementioned first transmission method, using transmitters such as that shown in FIG. 12.

For instance, if a data packet is transmitted from the transmitter 3-2 to the transmitter 1-1, the data packet is copied in the relay section 150 of the transmitter 2-1 and is relayed to the transmission path port 110 connected with the transmitters 1-1 to 1-n and to the transmission path port 120 connected with the transmitter 2-2. Because of this, the data packet relayed to the transmitter 2-2 returns to the transmitter 2-1 through the transmitters 2-3 and 2-4. Since the network portion 2 in the form of a ring has a closed transmission path, data packets can circulate through the ring path.

In the above-described case, the transmitter 2-1 relays a data packet toward the transmitter 2-2 as well as to the transmitter 1-1, so the data packet is also added onto the ring network portion 2. To avoid this, the number of hops (the number of relays from the transmitter 2-4 to the transmitter 1-1) is typically set to the header of a data packet, and a subtraction is made each time the data packet is relayed. After a predetermined number of relays, the data packet is discarded.

However, if a distance to the transmitter 1 (the number of hops) is long like the network 4 shown in FIG. 13 (particularly, if the value of n in reference numeral "1-n" is 4 or more, and 4 or more transmitters are connected in tandem), the number of hops at the transmitter 2-1 will reach a predetermined number.

If, in the network 4, a data packet is transmitted from the transmitters 1-1 to 1-n to the transmitters 2-2 to 2-4, data congestion will easily occur in the transmission path port 120 of the transmitter 2-1 because of the presence of data packets being circulated through the ring network portion 2, and consequently, an increase in traffic and the loss of transmitted packets will easily occur.

In the case where a network like FIG. 13 is constructed with transmitters having the same structure as that shown in FIG. 15, a data packet can be relayed only to a specified transmitter and therefore it is possible to solve the above-described problems, but since transmitting special data packets (such as multi-address transmission) is the equivalent of transmitting multi-destination packets, the same data congestion as the case of the above-described network 4 sometimes occurs. In this case, the problem of an increase in traffic and the loss of transmitted packets will easily arise and result in a reduction in the quality of transmission paths.

In addition, the network 4A shown in FIG. 16 has the following problems when transmitting data packets by the aforementioned second transmission method.

As shown in FIG. 16, both a data packet to be transmitted from the transmitter 5-1 to the transmitter 9 and a data packet to be transmitted from the transmitter 5-2 to the transmitter 9 have the same destination address, and the relay transmitter 7 relays these data packets through the same transmission path port without discriminating between the two.

In that case, the two data packets are transferred to the transmitter 9 through the same route (connected to the transmission path port 130), even when the path between the transmitters 7 and 9 has a redundant transmission path structure. Because of this, the network load on the route onto which data packets were transmitted is increased, and consequently, an increase in traffic and the loss of transmitted packets tend to take place.

On the other hand, even if the transmitter 7 relayed data packets to both ports in the manner shown in FIG. 12, the same data packet would be copied and transmitted and the traffic between the transmitters 7 and 9 would double.

The technique described in the aforementioned Japanese Laid-Open Patent Publication No. HEI 9-186715 is a technique to construct a virtual local area network (VLAN). Therefore, even if this technique is used in the transmitters of the networks 4 and 4A shown in FIGS. 13 and 16, an increase in traffic and the loss of transmitted packets can not be prevented.

In addition, the technique described in the aforementioned Japanese Laid-Open Patent Publication No. 2000-295274 is a technique for reducing microprocessor's routing load and security load. Therefore, even if this technique is employed in the transmitters of the networks 4 and 4A shown in FIGS. 13 and 16, an increase in traffic and the loss of transmitted packets can not be prevented.

SUMMARY OF THE INVENTION

The present invention has been made in view of the problems found in prior art. Accordingly, it is the object of the present invention to provide a transmitter and a transmission method that are capable of enhancing packet transmission efficiency, minimizing packet congestion, and improving the quality of transmission paths.

To achieve this end and in accordance with the present invention, there are provided transmitters in a network. The transmitters have an individual specific address and are connected through different transmission paths so that a packet with information about a source address is transmitted. Each transmitter comprises a plurality of transmission path ports respectively connected to the different transmission paths for receiving the packet, and a relay section for relaying the received packet to a relay transmission path of the transmission paths by which the received packet reaches its destination. The relay section comprises a routing table and a router. In the routing table, information about the relay of the received packet to one of the transmission path ports connected to the relay transmission path is stored, correlated with both a port identifier of each transmission path port and the source address of the transmitter that transmitted the packet. The router extracts the port identifier of the transmission path port that received the packet, and the source address contained in the received packet. The router routes the received packet to the transmission path port connected to the relay transmission path by referring to the table for the extracted port identifier and source address.

In accordance with the present invention, there is provided a packet transmission method for a network where transmitters with an individual address are connected through a transmission path so that a packet with information about the address of a source transmitter is transmitted from the source transmitter to a destination transmitter. In a relay transmitter between the source transmitter and the destination transmitter, the method comprises (a) a port extracting step of extracting the receiving port identifier in a packet received through the transmission path, (b) an address extracting step of extracting a source address contained in the received packet, and (c) a routing step of routing the received packet, based on the extracted receiving port identifier and the extracted source address.

Thus, according to the present invention, the table of the relay section stores information about the relay of a received packet to a transmission path port connected with a relay transmission path by which the received packet reaches its destination, and correlates the relay information with both the port identifier of each transmission path port that receives a packet and the address of a source transmitter that transmitted the received packet. The router routes a received packet by referring to the above-described table, based on the port identifier of a transmission path port that received a packet and on the source address contained in the received packet. Therefore, packet transmission efficiency can be enhanced, data congestion can be minimized, and the quality of transmission paths can be improved.

In addition, the table stores information that a received packet is not relayed if it circulates through a network, and information that a received packet is relayed if it does not circulate through a network. In this way, whether a data packet transmitted from the transmitter is transmitted to an individual address or multiple addresses, the circulation of the data packet can be prevented in an interval through which a data packet can circulate, such as a ring network, a mesh network, etc. Therefore, data congestion can be minimized, a reduction in traffic can be realized, and the quality of transmission paths can be enhanced.

In addition, in the case where a path to a destination transmitter is divided into a plurality of paths and has a redundant structure, transmission path ports to relay a received packet are assigned by the table so that many of them are not connected only to one of the paths. Thus, by efficiently utilizing the redundant structure, an increase in the networking load on the side where a data packet is transmitted can be prevented. In addition, an increase in traffic and the loss of transmitted packets can be minimized and packet transmission efficiency can be exponentially enhanced.

BRIEF DESCRIPTION OF THE DRAWINGS

The present invention will be described in further detail with reference to the accompanying drawings wherein:

FIG. 3 is a diagram showing how the table register of the transmitter shown in FIG. 2 is set;

FIG. 5 is a diagram showing how the table register of the transmitter shown in FIG. 2 is set;

FIG. 7 is a diagram showing how the table register of the transmitter shown in FIG. 2 is set;

FIG. 9 is a diagram showing how the table register of the transmitter shown in FIG. 8 is set;

FIGS. 10(*a*) and 10(*b*) are diagrams showing how the table register of the transmitter shown in FIG. 8 is set;

DESCRIPTION OF THE PREFERRED EMBODIMENTS

Embodiments of the present invention will hereinafter be described in detail with reference to the drawings.

Figure 1:
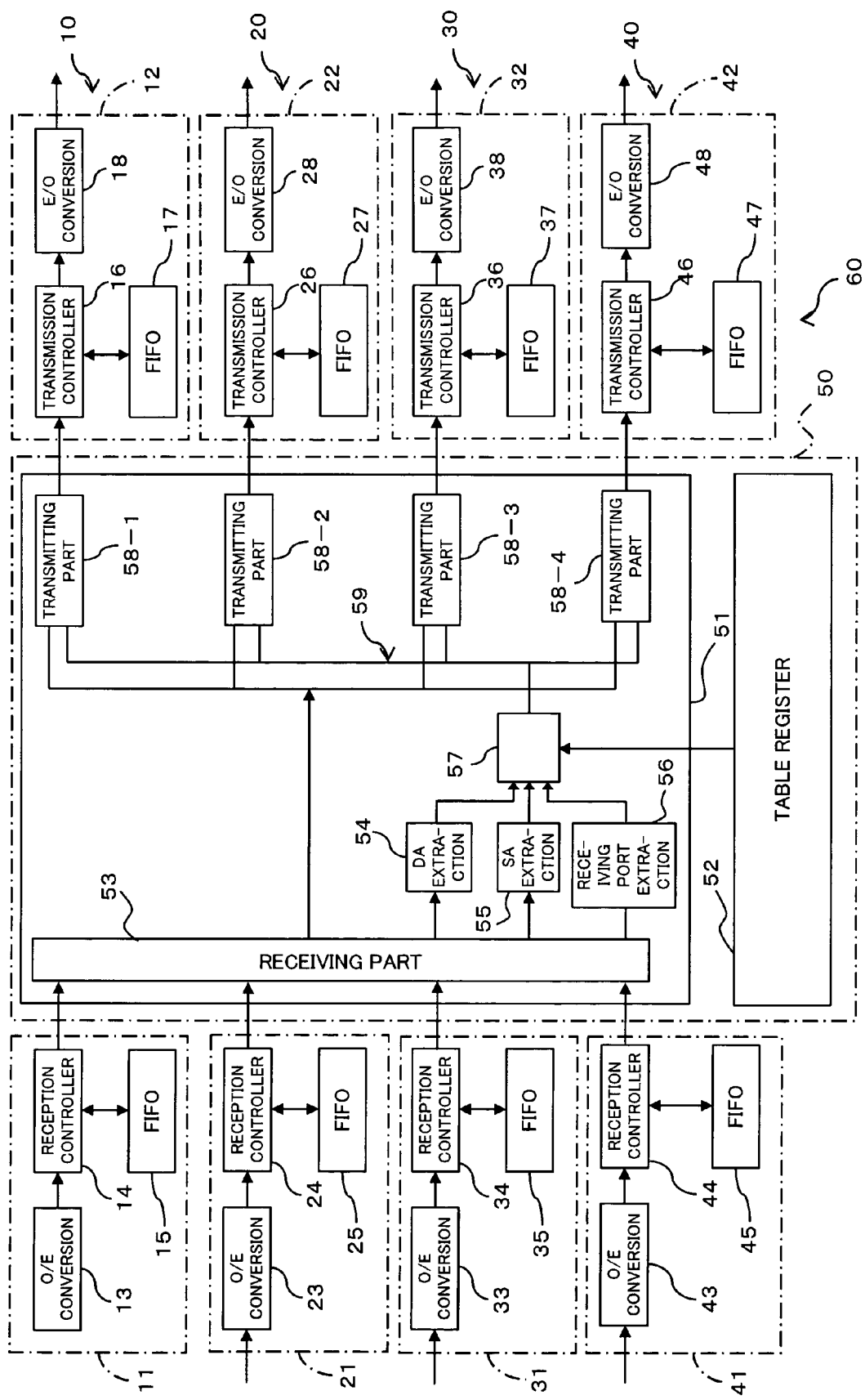
FIG. 1 is a block diagram showing a transmitter constructed in accordance with a preferred embodiment of the present invention.

[A] Description of a Transmitter According to a Preferred Embodiment of the Present Invention FIG. 1 shows a transmitter 60 constructed in accordance with a preferred embodiment of the present invention. The transmitter 60 includes receiving port sections 11, 21, 31, 41, transmitting port sections 12, 22, 32, 42, and a relay section 50. A plurality of transmitters with a specific address such as the transmitter 60 are connected through a transmission path such as optical fiber, and are used in a network where a packet with address information about a source transmitter is transmitted.

Figure 2:
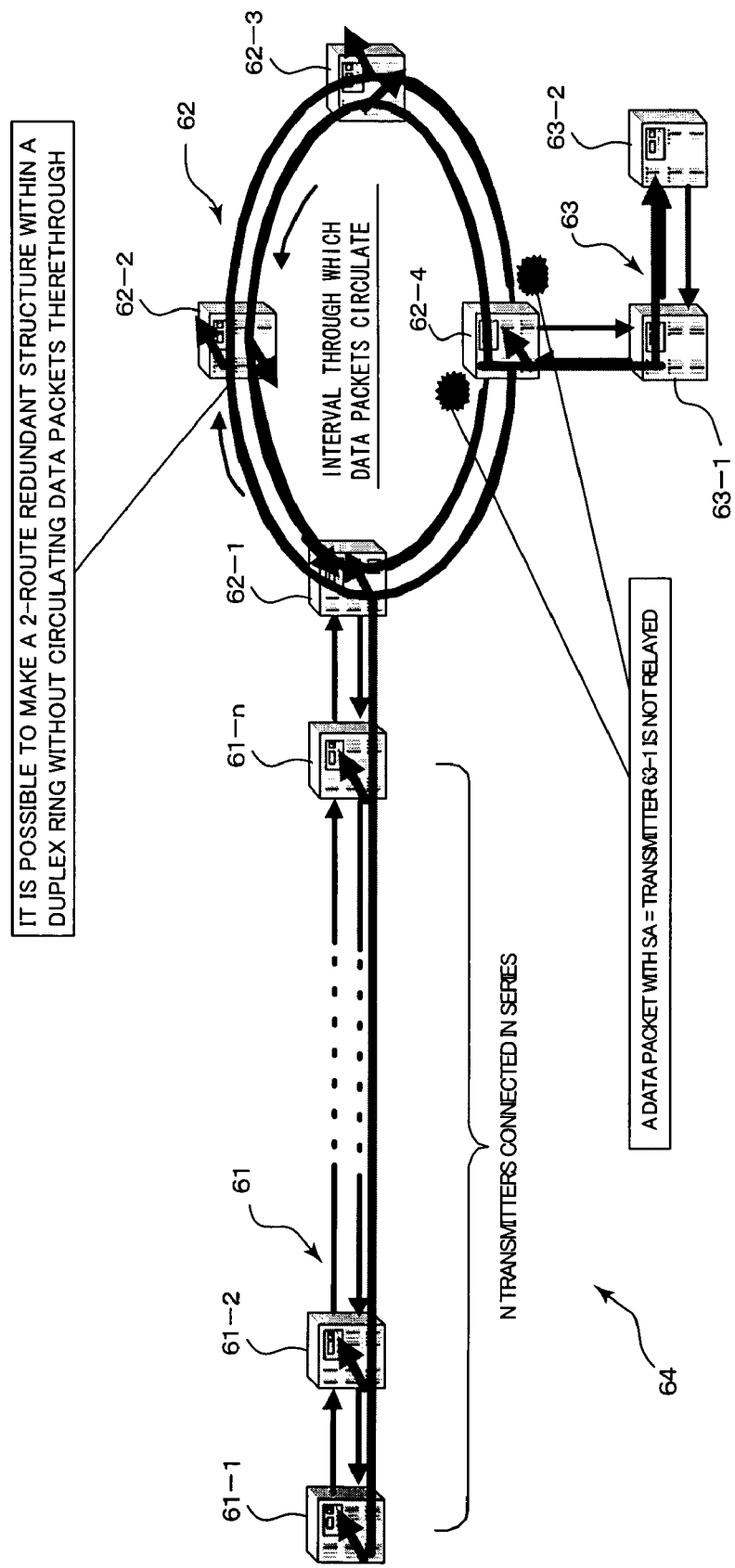
FIG. 2 is a perspective view showing a first network constructed of transmitters with the same structure as that of the transmitter shown in FIG. 1.

That is, by employing transmitters such as the transmitter 60 shown in FIG. 1, networks 64 and 64A can be constructed as shown in FIGS. 2 and 7. In addition, in a network, in which a plurality of transmitters with a structure like that shown in FIG. 1 are connected through optical fiber, the above-described packet can be multiplexed to a SONET/SDH frame and transmitted.

In FIG. 1, the receiving port sections 11, 21, 31, and 41 consist of O/E converters 13, 23, 33, 43, first-in first-out (FIFO) memories 15, 25, 35, 45, and reception controllers 14, 24, 34, 44, respectively. The O/E converters 13, 23, 33, and 43 convert an optical signal input via a transmission path into an electrical signal and also separate a multiplexed signal into packet signals. The FIFO memories 15, 25, 35 and 45 hold the converted electrical signal temporarily. The reception controllers 14, 24, 34, and 44 control the writing and reading of data with respect to the FIFO memories 15, 25, 35 and 45.

The transmitting port sections 12, 22, 32, and 42 consist of FIFO memories 17, 27, 37, 47, transmission controllers 16, 26, 36, 46, and E/O converters 18, 28, 38, 48, respectively. The FIFO memories 17, 27, 37, and 47 temporarily hold transmitted signals, output from the relay section 50. The transmission controllers 16, 26, 36, and 46 control the writing and reading of data with respect to the FIFO memories 17, 27, 37 and 47. The E/O converters 18, 28, 38, and 48 multiplex transmitted packet signals read out from the transmission controllers 16, 26, 36, and 46, and convert the multiplexed electrical signal into an optical signal.

The transmitter 60 shown in FIG. 1 is provided with 4 (four) transmission path ports 10, 20, 30, and 40, which are connected to 4 (four) transmitters through optical fiber paths. These transmission path ports 10, 20, 30, and 40 have port numbers as specific port identifiers, respectively.

The above-described receiving port section 11 and transmission port section 12 constitute the first transmission path port 10. The above-described receiving port section 21 and transmission port section 22 constitute the second transmission path port 20. The above-described receiving port section 31 and transmission port section 32 constitute the third transmission path port 30. The above-described receiving port section 41 and transmission port section 42 constitute the fourth transmission path port 40. In other words, the transmission path ports 10, 20, 30, and 40 serve as ports that are connected to the transmission paths of a network.

Figure 12:
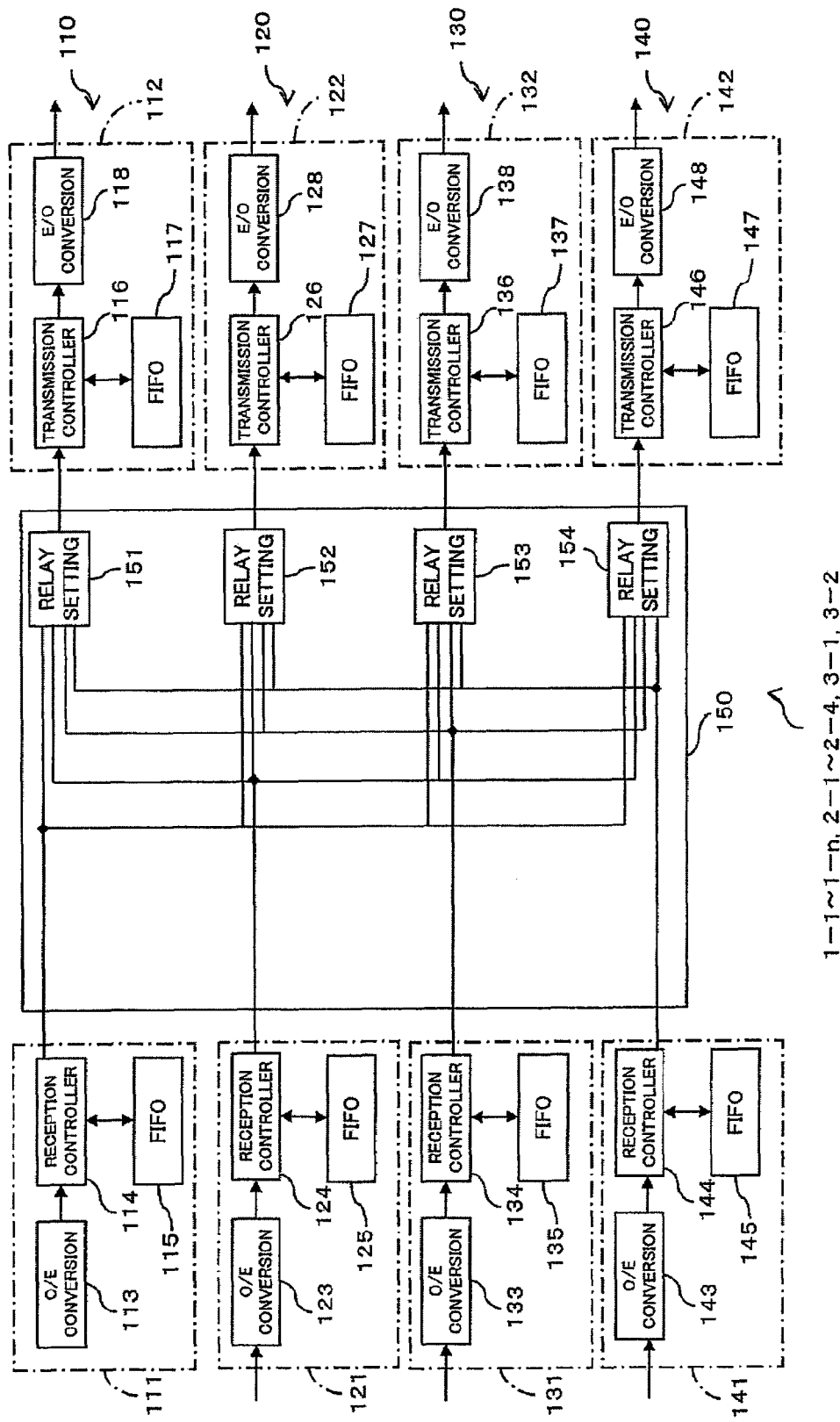
FIG. 12 is a block diagram showing a conventional transmitter.

In the relay section 50, the transmission path ports 10, 20, 30, and 40 receive packets and retransmit them onto relay transmission paths by which the received packets travel to their destinations. The relay section 50 consists of a routing section 51 and a table register 52, which are different in structure from those shown in FIG. 12.

The table register 52 serves as a table that stores information about the relay of a received packet to a transmission path port connected with a relay transmission path, correlated with both the receiving port number (port identifier) of each transmission path port that receives a packet, and the address of a source transmitter (source address) contained in the header of a received packet. In the preferred embodiment, the table register 52 can also dynamically or statically set the identification number (transmitting port number) of a transmitting port section (relay port section) for each destination address, along with the above-described source address and receiving port number.

The routing section 51 extracts the port identifier of a transmission path port that received a packet, and the source address of a source transmitter contained in the received packet. By searching the table register 52 for the extracted port identifier and source address, the routing section 51 also retransmits the received packet to a transmission path port connected with a relay transmission path by which the received packet travels to its destination. To perform these functions, the routing section 51 is equipped with a receiving part 53, a destination address (DA) extracting part 54, a source address (SA) extracting part 55, a receiving port extracting part 56, and a routing processing part 59.

The receiving part 53 receives packets from the receiving controllers 14, 24, 34, and 44 in a predetermined sequence. The destination address extracting part 54 extracts the destination address of a destination transmitter from a packet signal received by the receiving part 53. The source address extracting part 55 extracts the source address of a source transmitter from a packet signal received by the receiving part 53.

Note that since a destination address and a source address can be contained in the header of a packet, the destination address extracting part 54 and the source address extracting part 55 can extract a destination address and a source address from the content of the packet header.

For a received packet signal from which a source address and a destination address were extracted by the destination address extracting part 54 and the source address extracting part 55, the receiving port extracting part 56 extracts the receiving port number of the receiving port section 11, 21, 31, or 41 to which the received packet signal was input as a frame signal. That is, the receiving port extracting part 56 serves as a receiving port identifier extracting part that extracts the receiving port number (receiving port identifier) of the receiving port 10, 20, 30, or 40 that received a packet through a transmission path.

In response to the receiving port number (receiving port identifier) from the receiving port extracting part 56 and the source address of a source transmitter from the source address extracting part 55, the routing processing part 59 searches the table register 52 for the receiving port number and the source address, and then routes the received packet. To perform this routing function, the routing processing part 59 is equipped with a judging part 57 and transmitting parts 58-1 to 58-4.

The judging part 57 judges whether a received packet is relayed by referring to the table register 52 with the receiving port number from the receiving port extracting part 56 and the address of a source transmitter from the source address extracting part 55 as keys, and selectively decides the transmitting port section 12, 22, 32, or 42 (which becomes a relay port) for each received packet.

The judging part 57 can also decide the transmitting port section 12, 22, 32, or 42 (to which a packet is transferred) by referring to the table register 52, based on the destination address from the destination address extracting part 54, along with the receiving port number from the receiving port extracting part 56 and the source address from the source address extracting part 55.

If the transmitting port section 12, 22, 32, or 42 is decided in the aforementioned manner, the judging part 57 commands the transmitting part (58-1, 58-2, 58-3, or 58-4) connected to the decided transmitting port section (12, 22, 32, or 42) to output a received packet to the subsequent stage.

That is, the transmitting parts 58-1 to 58-4 (which serve as an assigning part) assign a received packet from the receiving part 53, to the transmitting port section 12, 22, 32, or 42, based on the result of judgement from the routing part 57.

More specifically, a received packet from the receiving part 53 is transferred to the subsequent stage from the transmitting part (58-1, 58-2, 58-3, or 58-4) connected to the transmitting port section (12, 22, 32, or 42) in which it was judged that a received packet is relayed. From the transmitting part (58-1, 58-2, 58-3, or 58-4) connected to the transmitting port section (12, 22, 32, or 42) in which it was judged that a received packet is not relayed, no packet is transferred to the subsequent stage.

Therefore, in response to a command from the above-described judging part 57, the transmitting part (58-1, 58-2, 58-3, or 58-4), connected to the transmitting port section (12, 22, 32, or 42) decided as a port to which a received packet is transferred, transmits a received packet (from the receiving section 53) to the subsequent transmission controller (16, 26, 36, or 46).

Therefore, in a network where a plurality of transmitters like the transmitter 60 with such a structure are connected through transmission paths, a packet from a source transmitter to a destination transmitter is relayed according to the following routing by a relay transmitter.

Initially, if a multiplexed frame is received as an optical signal from any of the receiving port sections 11, 21, 31, and 41 of the transmission path ports 10, 20, 30, and 40, the O/E converters 13, 23, 33, and 43 of the receiving port sections 11, 21, 31, and 41 convert the multiplexed signal into an electrical signal and separates it into packet signals. In the reception controllers 14, 24, 34, 44 and FIFO memories 15, 25, 35, 45, the received packet signals are output to the receiving part 53 in a predetermined sequence.

In the receiving port extracting part 56, a receiving port identifier in the packet received by the receiving part 53 is extracted (receiving port extracting step), and in the source address extracting part 55, a source address contained in the received packet is extracted (source address extracting step).

Based on the receiving port identifier from the receiving port extracting part 56 and the source address from source address extracting part 55, the received packet is routed by the judging part 57 and the transmitting parts 58-1 to 58-4 (routing step).

In the judging part 57, the relay of a received packet is judged based on the receiving port identifier extracted by the receiving port extracting step and the source address extracted by the source address extracting step (judgement step). In the transmitting parts 58-1 to 58-4, if it is judged that a received packet is relayed, that packet is assigned to the transmitting port section 12, 22, 32, or 42. On the other hand, if it is judged that a received packet is not relayed, information is sent that a received packet is not relayed, and the assignment of a received packet to the correlated transmitting port section 12, 22, 32, or 42 is not performed (assignment step).

Thereafter, the transmission controllers 16, 26, 36, and 46, which received a packet signal from any of the transmitting parts 58-1 to 58-4, perform first-in first-out control in cooperation with the FIFO memories 17, 27, 37, and 47. In the E/O converters 18, 28, 38, and 48, packet signals from the transmission controllers 16, 26, 36, and 46 are framed and converted into an optical signal. This makes it possible to transmit a framed packet signal toward a destination transmitter through a transmission path (optical fiber).

Now, a description will be given of a first network 64 (see FIG. 2) and a second network 64A (see FIG. 8), constructed of transmitters such as the transmitter 60.

[B] Description of a First Network Constructed According to the Preferred Embodiment of the Present Invention FIG. 2 depicts a first network 64 constructed of transmitters 61-1 to 61-n, 62-1 to 62-4, 63-1, and 63-2 with the same structure as that of the transmitter 60 shown in FIG. 1. The transmitters 61-1 to 61-n, 62-1 to 62-4, 63-1, and 63-2 constituting the first network 64 shown in FIG. 2 have specific addresses and are connected through optical-fiber transmission paths.

Figure 13:
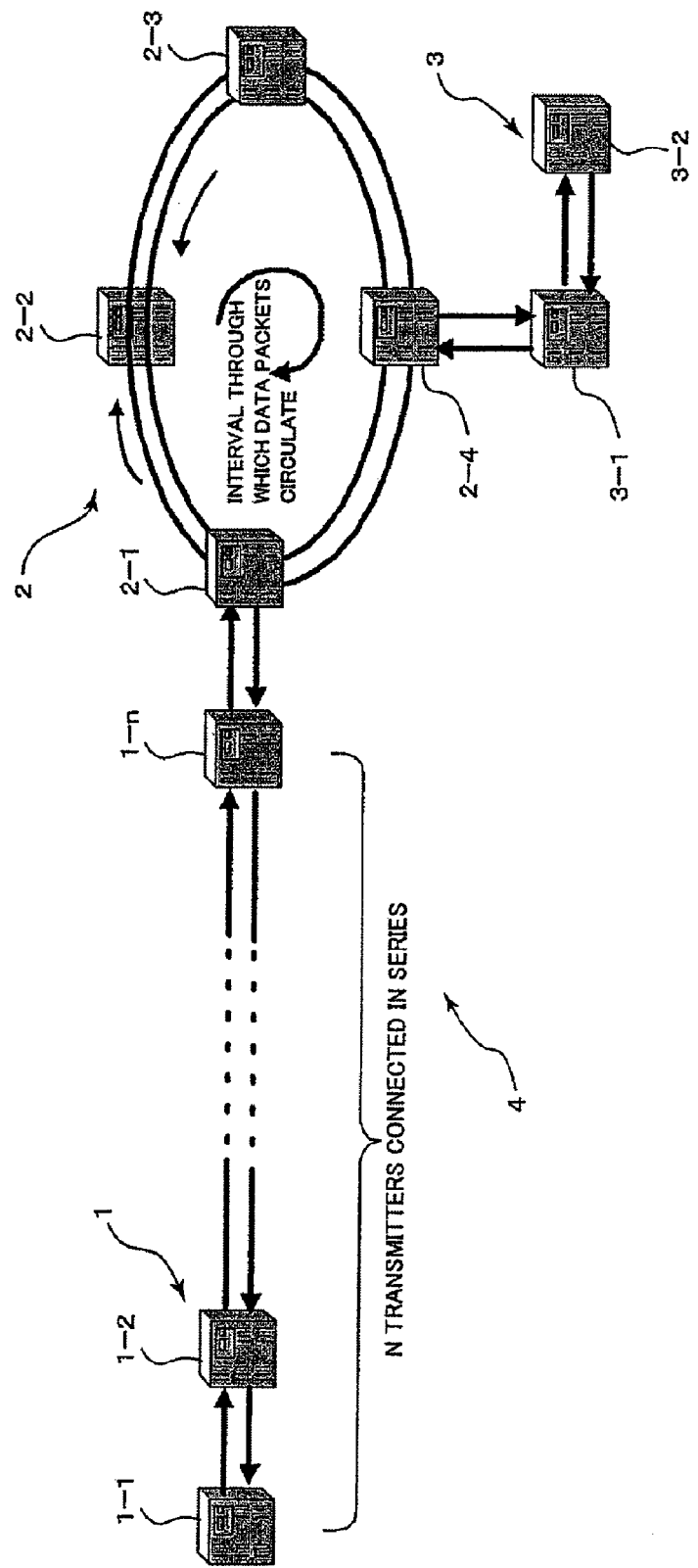
FIG. 13 is a perspective view showing a conventional network that consists of transmitters such as that shown in FIG. 12.
Figure 14:
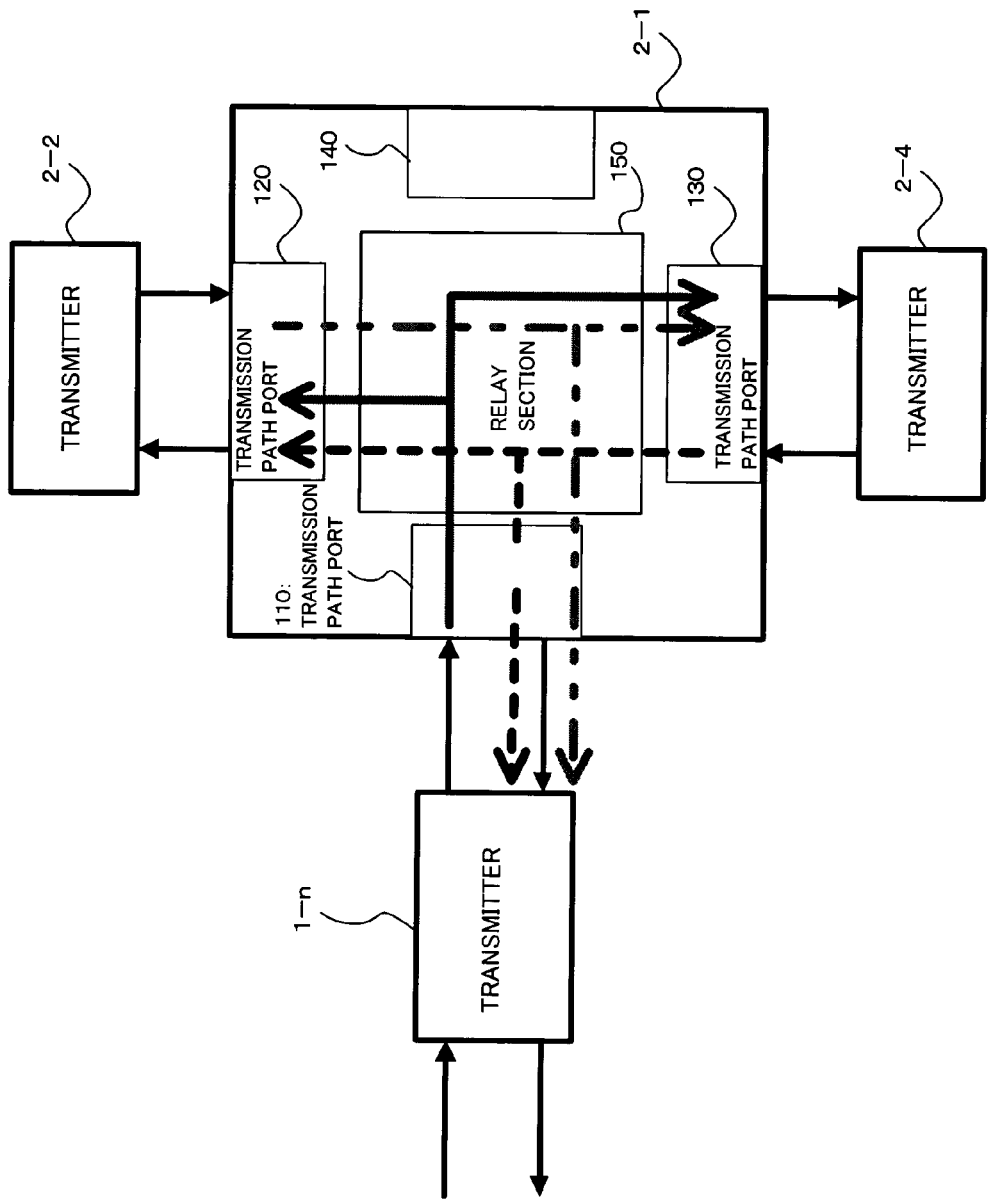
FIG. 14 is a block diagram showing how data packets are delayed in the network of FIG. 13.
Figure 15:
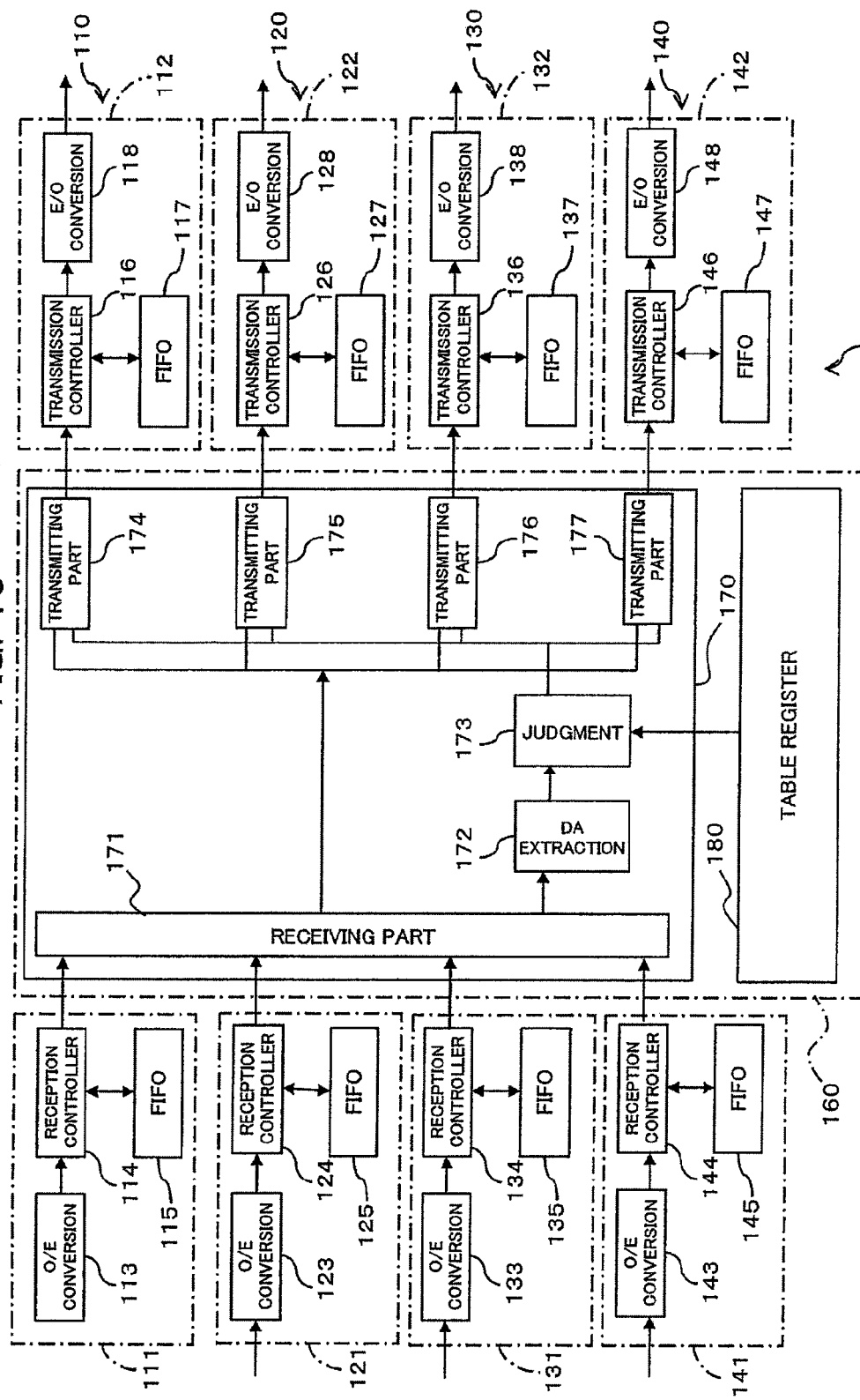
FIG. 15 is a block diagram showing another conventional transmitter.

In the first network 64 shown in FIG. 2, the transmitters 61-1 to 61-n, 62-1 to 62-4, 63-1, and 63-2 are arranged the same as the network 4 shown in FIG. 13, but the first network 64 is constructed to prevent congestion, an increase in traffic, and the loss of transmitted packets by eliminating a data packet circulating through a closed path to prevent data from being congested at the transmission path port of a certain transmitter.

The network 64 consists of a first network portion 61, a second network portion 62, and a third network portion 63. In the first network portion 61, transmitters 61-1 to 61-n are connected in tandem. In the second network portion 62, transmitters 62-1 to 62-4 are connected in duplex ring form. In the third network portion 63, transmitters 63-1 and 63-2 are connected in tandem. The transmitter 61-n is connected to the transmitter 62-1, so the first and second network portions 61 and 62 are connected together. The transmitter 62-4 is connected to the transmitter 63-1, so the second and third network portions 2 and 3 are connected together.

As with the network portion 2 of the network 4 shown in FIG. 13, the second network portion 62 consisting of transmitters 62-1 to 62-4 is an interval through which data packets can circulate. However, as described above, the second network portion 62 is constructed so packet circulation does not occur. For instance, a received packet is relayed as shown in FIGS. 3 and 5 in accordance with the table register 52 of the relay transmitter 62-1 and 62-4.

More specifically, if the table register 52 of the transmitter 62-1 is set as shown in FIG. 3, data packets input via the receiving port sections 11 to 31 of the transmission path ports 10 to 30 are routed by the routing section 51 so the packets do not circulate through the ring network portion 62.

Figure 4:
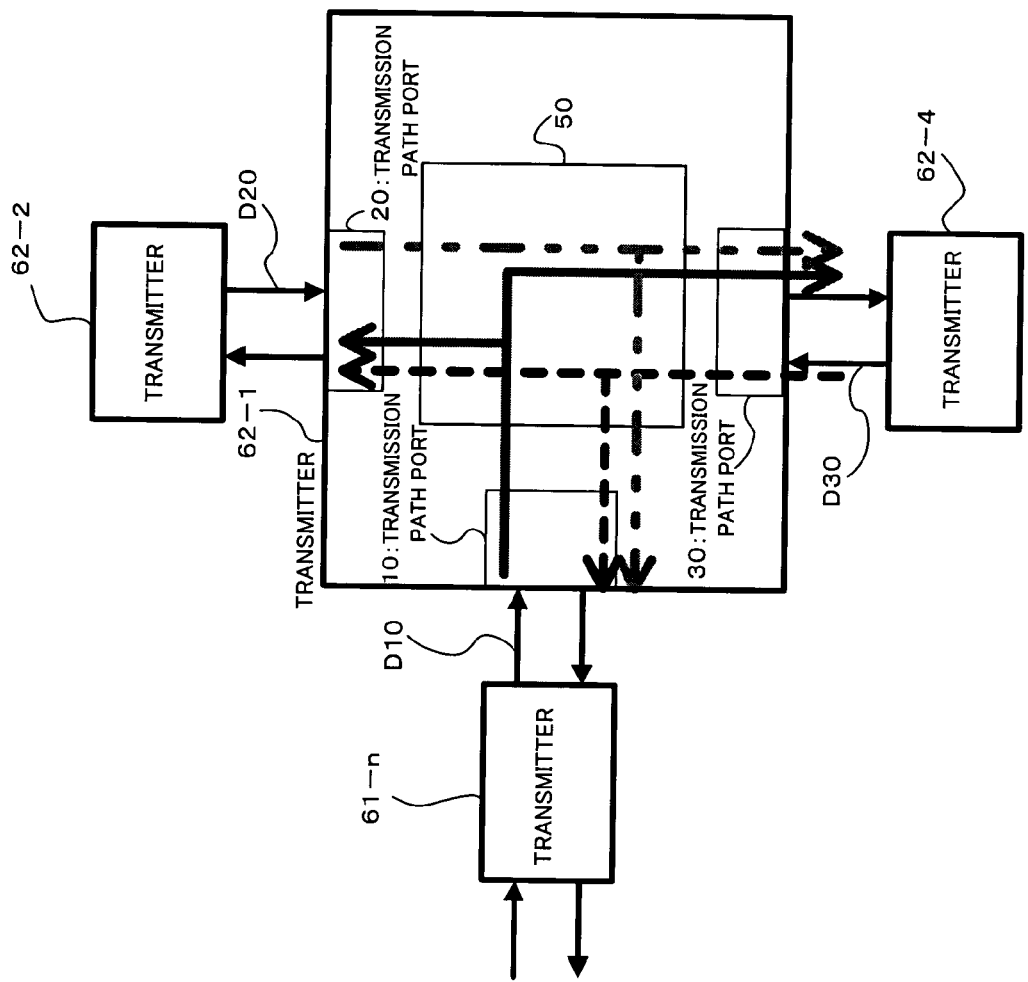
FIG. 4 is a block diagram showing how data packets are relayed in the network shown in FIG. 2.

Among data packets input via the receiving port section 11 of the transmission path port 10 connected with the transmission path between the port 10 and the transmitter 61-n (see D10 in FIG. 4), the data packets with the source addresses of the transmitters 61-1 to 61-n that are on the path connected to the transmission path port 10 are relayed (○), whereas the data packets with the source addresses of the transmitters 62-1 to 62-4, 63-1, and 63-2 other than those are not relayed (X).

Among data packets input via the receiving port section 21 of the transmission path port 20 connected with the transmission path between the port 20 and the transmitter 62-2 (see D20 in FIG. 4), the data packets with the source addresses of the transmitters 62-2 to 62-4, 63-1, and 63-2 that are on the paths connected to the transmission path port 20 are relayed (○), whereas the data packets with the source addresses of the transmitters 61-1 to 61-n and 62-1 other than those are not relayed (X).

Among data packets input via the receiving port section 31 of the transmission path port 30 connected with the transmission path between the port 30 and the transmitter 62-4 (see D30 in FIG. 4), the data packets with the source addresses of the transmitters 62-2 to 62-4, 63-1, and 63-2 that are on the paths connected to the transmission path port 30 are relayed (○), whereas the data packets with the source addresses of the transmitters 61-1 to 61-n and 62-1 other than those are not relayed (X).

Furthermore, if the table register 52 of the transmitter 62-4 is set as shown in FIG. 5, data packets input via the receiving port sections 11 to 31 of the transmission path ports 10 to 30 are relayed so that packets do not circulate through the ring network portion 62.

Figure 6:
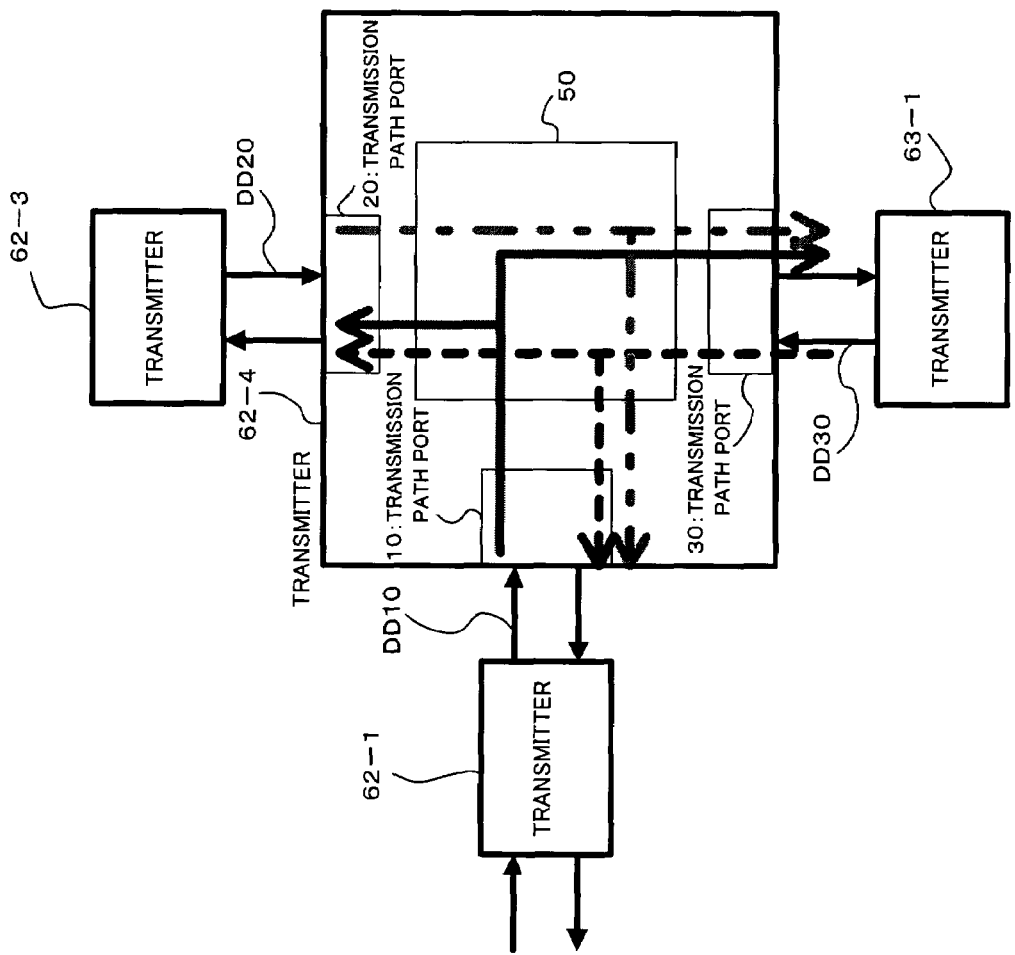
FIG. 6 is a block diagram showing how data packets are relayed in the network shown in FIG. 2.

That is, among data packets input via the receiving port section 11 of the transmission path port 10 connected with the transmission path between the port 10 and the transmitter 62-1 (see DD10 in FIG. 6), the data packets with the source addresses of the transmitters 61-1 to 61-n and 62-1 to 62-3 that are on the paths connected to the transmission path port 10 are relayed (○), whereas the data packets with the source addresses of the transmitters 62-4, 63-1, and 63-2 other than those are not relayed (X).

Among data packets input via the receiving port section 21 of the transmission path port 20 connected with the transmission path between the port 20 and the transmitter 62-3 (see DD20 in FIG. 6), the data packets with the source addresses of the transmitters 61-1 to 61-n and 62-1 to 62-3 that are on the paths connected to the transmission path port 20 are relayed (○), whereas the data packets with the source addresses of the transmitters 62-4, 63-1, and 63-2 other than those are not relayed (X).

Among data packets input via the receiving port section 31 of the transmission path port 30 connected with the transmission path between the port 30 and the transmitter 63-1 (see DD30 in FIG. 6), the data packets with the source addresses of the transmitters 63-1 and 63-2 that are on the path connected to the transmission path port 30 are relayed (○), whereas the data packets with the source addresses of the transmitters 61-1 to 61-n and 62-1 to 62-4 other than those are not relayed (X).

In other words, in the relay transmitters 62-1 and 62-4 to which a plurality of paths are connected through the different transmission path ports, data packets received via the transmission path ports 10 to 30 are relayed when the source addresses in those packets are the same as those of the transmitters on the paths connected to transmission path ports 10 to 30 and not relayed when the source addresses in those packets are the same as those of the transmitters (including a self-transmitter) that are not on the path connected to the transmission path port 10.

In the transmitters 61-1 to 61-n, 62-2, 62-3, 63-1, and 63-2 other than the above-described transmitters 62-1 and 62-4, data packets are relayed according to the table register 52 set as shown in FIG. 7. Among data packets input via the receiving port sections 11 to 31 of the transmission path port 10 to 30, the data packets with the source addresses of the transmitters other than self-transmitters are relayed (○), whereas the data packets with the source addresses of self-transmitters are not relayed (X).

In other words, the table registers 52 of the transmitters 61-1 to 61-n, 62-1 to 62-4, 63-1, and 63-2 of the network 64 store information about the relay of a received packet correlated with both the receiving port identifier and the source address. For example, the table registers 52 store information that a received packet is not relayed (X) if it circulates through the network 64 (particularly the network portion 62), and information that a received packet is relayed (○) if it does not circulate through the network 64.

In this way, data packets that pass through the path of the network portion 62 from any of the transmitters 62-1 to 62-4 are discarded in at least the source transmitters when they have returned, so they do not circulate through the network portion. For example, a data packet from the transmitter 62-1 that is a source transmitter is relayed to the transmitters 62-2 and 62-3 and to the transmitter 62-4, but in the source transmitter 62-1, the data packet relayed from the transmitter 62-4 is discarded without being transferred to the transmitter 62-2.

In the transmitter 62-4, a data packet transmitted from the transmitter 63-1 is relayed to both the transmission path port on the side of the transmitter 62-1 and the transmission path port on the side of the transmitter 62-3. However, in the case where the data packet from the transmitter 63-1 circulates through the network portion 62 and is again received by the transmission path ports 10 and 20 of the transmitter 62-4, this data packet is not relayed to the subsequent stage, and therefore data can be discarded without being circulated through the network portion 62 again.

Therefore, in the transmitter 62-4, the data packets from the transmitters 62-1, 62-2, and 62-3 in the ring network portion 62 are relayed and a data packet being circulated through the network portion 62 can be reliably prevented from being circulated again. Therefore, even in the case of data packets by multi-address communications, data communications to transmitters on a network can be reliably performed and congestion due to packet circulation can be avoided.

Note that an example of the above-described data packets by multi-address communications is network supervisory packets that are contained in a multiplexed frame and transmitted to the transmitters 61-1 to 61-n, 62-1 to 62-4, and 63-1, through a network management server (not shown) included in the transmitter 63-2.

Thus, according to the preferred embodiment of the present invention, the table register 52 of the relay section 50 stores information about the relay of a received packet to a transmission path port connected with a relay transmission path by which the received packet reaches its destination, and correlates the relay information with both the port identifier of each transmission path port that receives a packet and the address of a source transmitter that transmitted the received packet. The routing section 51 routes a received packet by referring to the above-described table register 52, based on the port identifier of a transmission path port that received a packet and on the source address contained in the received packet. Therefore, packet transmission efficiency can be enhanced, data congestion can be minimized, and the quality of transmission paths can be improved.

In addition, according to the preferred embodiment of the present invention, the network 64 shown in FIG. 2 is constructed of transmitters with the same structure as that of the transmitter 60, and the table register 52 stores information that a received packet is not relayed if it circulates through a network, and information that a received packet is relayed if it does not circulate through a network. In this way, whether a data packet transmitted from the transmitter 63-1 is transmitted to an individual address or multiple addresses, the circulation of the data packet can be prevented in an interval through which a data packet can circulate, such as a ring network, a mesh network, etc. Therefore, data congestion can be minimized, a reduction in traffic can be realized, and the quality of transmission paths can be enhanced.

Figure 8:
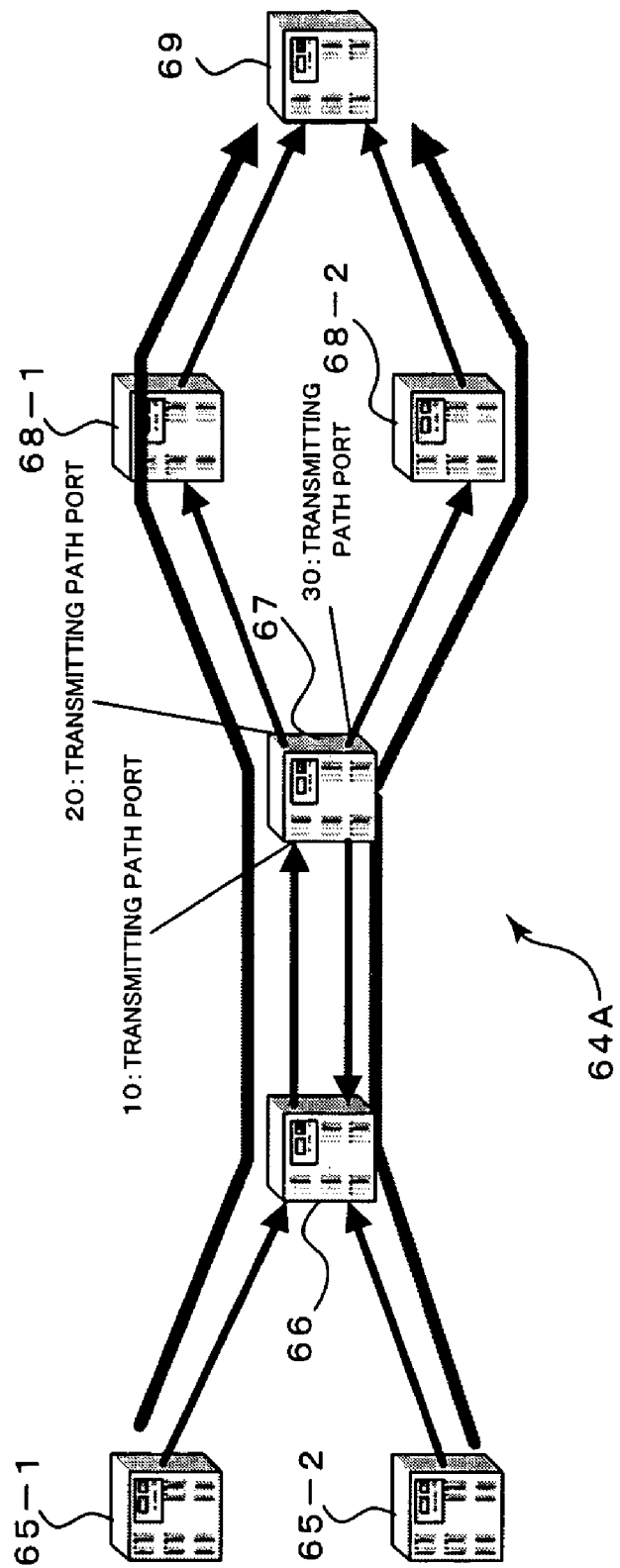
FIG. 8 is a perspective view showing a second network constructed of transmitters with the same structure as that of the transmitter shown in FIG. 1.

[C] Description of a Second Network Constructed According to the Preferred Embodiment of the Present Invention FIG. 8 depicts a second network 64A constructed of transmitters 61-1 to 61-n, 62-1 to 62-4, 63-1, and 63-2 with the same structure as that of the transmitter 60 shown in FIG. 1.

Figure 16:
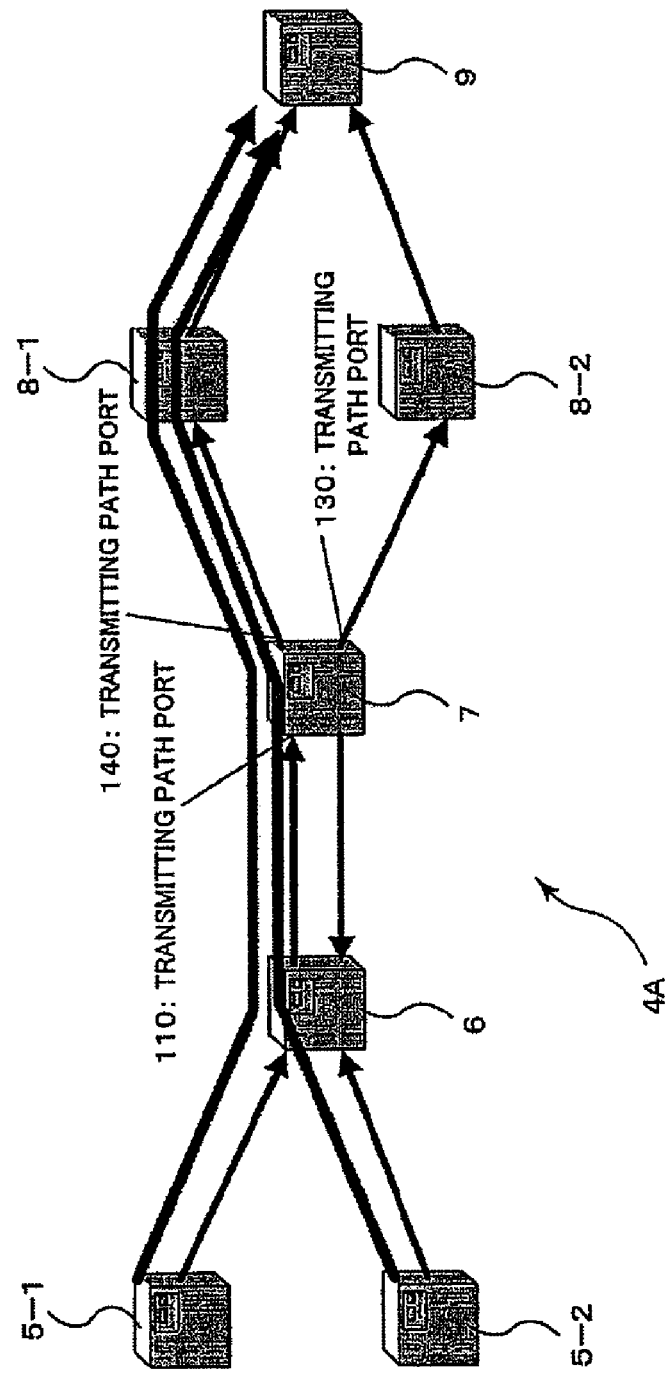
FIG. 16 is a perspective view showing another conventional network that consists of transmitters such as the one shown in FIG. 15.
Figure 17:
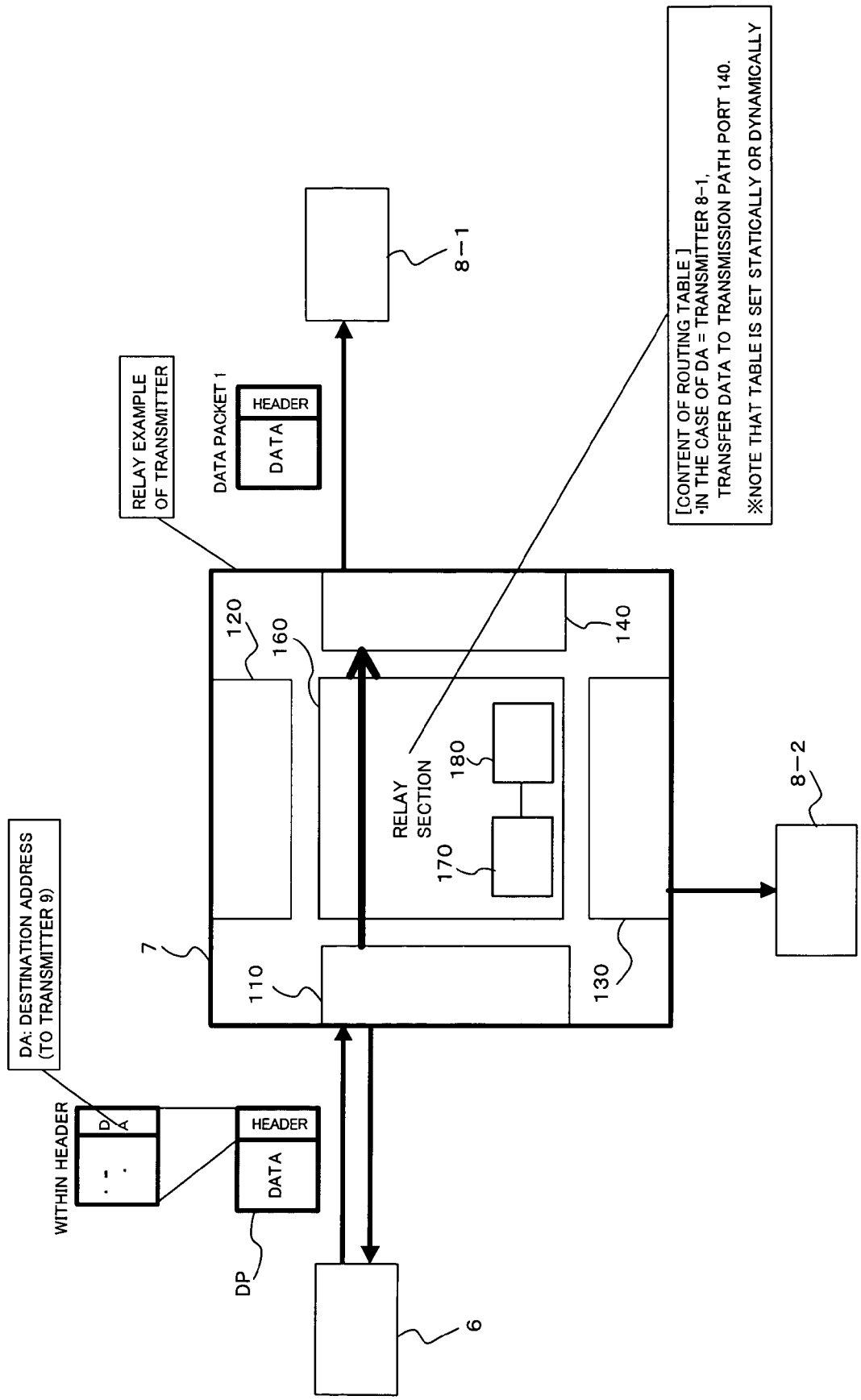
FIG. 17 is a block diagram showing how data packets are delayed in the network of FIG. 16.

In the network 64A shown in FIG. 8, the transmitters 65-1, 65-2, 66, 67, 68-1, 68-2, and 69 are arranged the same as those of the network 4A shown in FIG. 16. The network 64A, as with the network 4A, has a redundant transmission structure between the transmitters 67 and 69. That is, the transmission path port 20 of the transmitter 67 is connected to the transmitter 69 via the transmitter 68-1, and the transmission path port 30 of the transmitter 67 is connected to the transmitter 69 via the transmitter 68-2.

If each of the transmitters 65-1, 65-2, 66, 67, 68-1, 68-2, and 69 is constructed as shown in FIG. 1, and data packets are transmitted via the above-described redundant transmission structure, transmission paths can be assigned according to source addresses.

For example, consider a data packet whose destination address is the transmitter 69, input via the receiving port section 11 of the transmission path port 10 of the transmitter 67. To assign the relay transmission path ports 20 and 30 by the transmitting parts 58-1 to 58-4 (see FIG. 1) in accordance with the source address extracted from that data packet, data packets are relayed as shown in FIG. 9 by the table register 52 of the transmitter 67.

That is, for the data packet whose source address is the transmitter 65-1, input via the receiving port section 11 of the transmission path port 10 of the transmitter 67, a relay through the transmission port 20 is performed (○), whereas a relay through the transmission port 30 is not performed (X). For a data packet whose source address is the transmitter 65-2, a relay through the transmission port 20 is not performed (X), whereas a relay through the transmission port 30 is performed (○).

In this way, in the relay transmitter 67, the data packet that is transmitted from the transmitter 65-1 to the transmitter 69 is relayed to the transmitter 69 through the transmitter 68-1, based on the source address and the receiving port identifier in the header of that data packet. The data packet that is transmitted from the transmitter 65-2 to the transmitter 69 is relayed to the transmitter 69 through the transmitter 68-1.

In other words, in the case where a path to the transmitter 69 (destination) is divided into a plurality of paths (in the case of FIG. 8, two paths) and has a redundant structure, a transmission port section correlated with both a receiving port identifier and a source address is assigned according to the table register 52 by the routing section 51 so that many data packets are not relayed only to one of the paths.

In the network 64A shown in FIG. 8, when data packets are transmitted from the transmitters 65-1 and 65-2 to the transmitter 69, the following routing is performed in the transmitter 67.

As shown in FIG. 1, in the routing section 51 of the transmitter 67, a destination address and a source address in the header of a data packet received through the receiving port section 11 of the transmission path port 10 are extracted by the destination address extracting part 54 and the source address extracting part 55.

Based on the identification number of a receiving port section extracted by the receiving port extracting part 56 along with the extracted destination address and source address, the judging part 57 determines the transmission path port 20 or 30 for each data packet by referring to the content of the table register 52. Based on the determined transmission path ports 20 and 30, the judging part 57 gives commands to the transmitting parts 58-1 to 58-4. In response to these commands, the transmitting parts 58-1 to 58-4 perform the assignment of data packets to the determined transmission path ports 20 and 30.

In this way, a data packet from the transmitter 65-1 to the transmitter 69 is transmitted through the transmission port section 22 of the transmission path port 20, so it is relayed to the transmitter 69 via the transmitter 68-1. A data packet from the transmitter 65-2 to the transmitter 69 is transmitted through the transmission port section 32 of the transmission path port 30, so it is relayed to the transmitter 69 via the transmitter 68-2.

Thus, according to the preferred embodiment of the present invention, the transmitters 65-1, 65-2, 66, 67, 68-1, 68-2, and 69 are equipped with the relay section 50, which has the routing section 51 and the table register 52. Therefore, as in the network 64 shown in FIG. 2, packet transmission can be enhanced, data congestion can be minimized, and the quality of transmission paths can be improved.

In addition, in the case where the network 64A such as that shown in FIG. 8 is constructed of transmitters with the same structure as that of the transmitter 60, and a path from the transmitter 67 to the transmitter 69 (destination) is divided into a plurality of paths and has a redundant structure, transmission path ports to relay a received packet are assigned by the table register 52 so that many of them are not connected only to one of the paths. Thus, by efficiently utilizing the redundant transmission path structure between the transmitters 67 and 69, an increase in the networking load on the side where a data packet is transmitted can be prevented. In addition, an increase in traffic and the loss of transmitted packets can be minimized and packet transmission efficiency can be further enhanced.

[D] Others

In the transmitters constituting the networks 64 and 64A shown in FIGS. 2 and 8, the table register 52 stores information about the relay of a packet for each relay transmission path port (which delays a packet to its destination), and correlates the relay information with both a source address extracted by the source address extracting part 55 and a receiving port identifier extracted by the receiving port extracting part 56. However, the table register 52 according to the present invention is also capable of employing an index for other routing in combination with the above-described source address and receiving port identifier. In such a case, in addition to the above-described advantages of the present invention, the degree of freedom of packet transmission between transmitters can be enhanced.

For example, as shown in FIG. 10(a), the relay of a packet can also be stored for each transmission path port (which relays a packet to its destination), correlated with a combination of the above-described source address and receiving port identifier and a destination address. In this case, as shown in FIG. 10(a), even when a received packet has the same source address and the same receiving port identifier, it is relayed if its destination is a transmitter m1, but it is not relayed if its destination is a transmitter m2.

In this case, as shown in FIG. 10(b), all transmission path ports may be designated as a transmission path port which delays a received packet to its destination (don't care). That is, for data packets with the same source address and receiving port identifier, a data packet whose destination address is m1 is relayed through all transmission path ports 10, 20, 30, and 40, but a data packet whose destination address is m2 is not relayed.

In the transmitter according to the preferred embodiment, while the ring network portion 62 shown in FIG. 2 has been described as a path through which a received packet circulates, the present invention is not limited to this example. The present invention is also applicable to a mesh network portion through which a received packet can circulate.

In addition, the present invention is not to be limited to the forms of the networks shown in FIGS. 2 and 8. In various forms of networks, which have a packet circulating path or a redundant path structure, other than those, the present invention possesses the above-described advantages.

Figure 11:
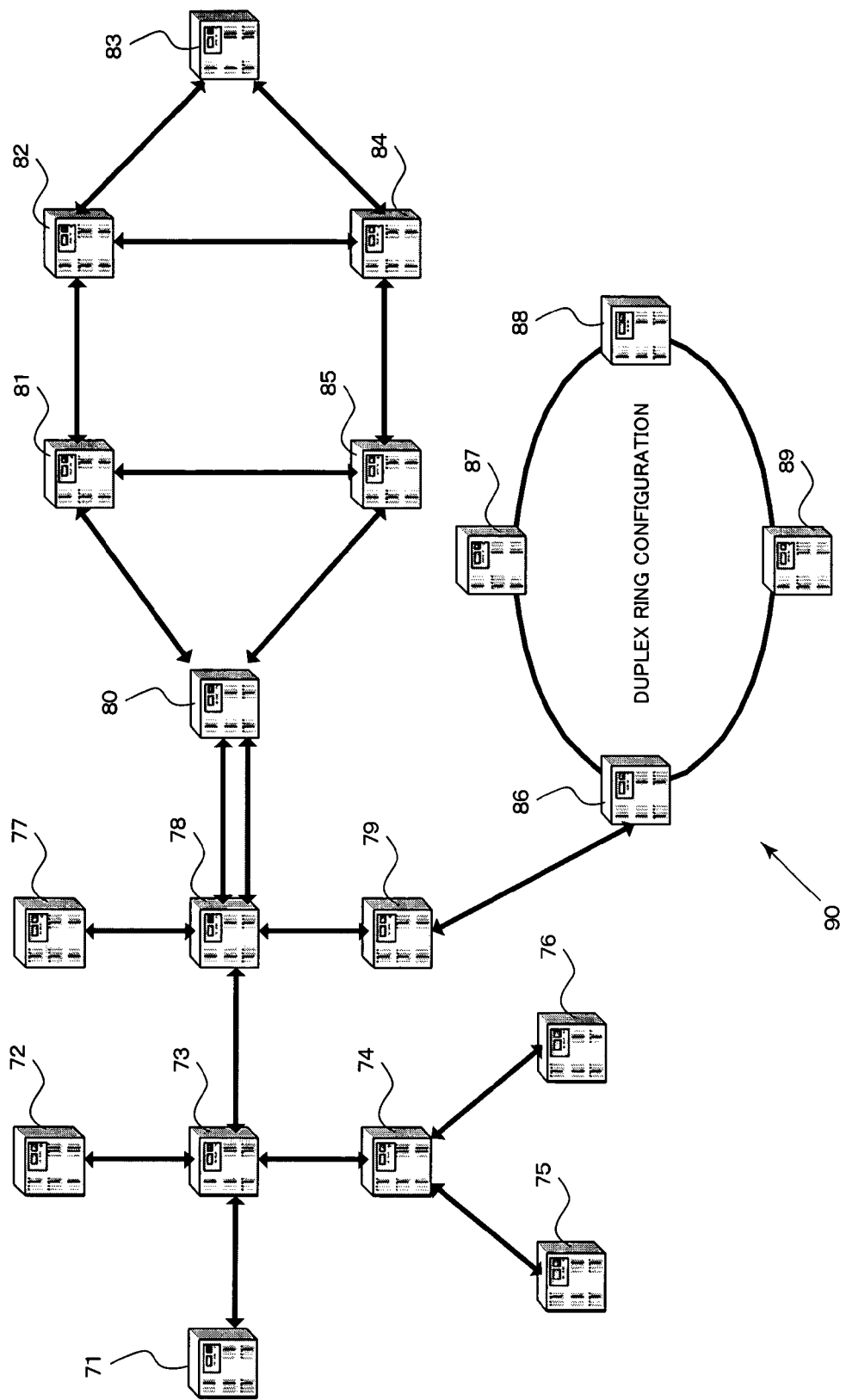
FIG. 11 is a perspective view showing a third network constructed of transmitters with the same structure as that of the transmitter shown in FIG. 1.

For instance, a network 90 with transmitters 71 to 89 can be constructed as shown in FIG. 11. In this network 90, data packets can circulate through a network portion consisting of transmitters 80 to 85 and a network portion consisting of transmitters 86 to 89, but when the transmitters 71 to 89 are constructed as shown in FIG. 1, packet circulation can be prevented in the above-described network portions.

In the case where the path from the transmitter 80 to the transmitter 83 has a redundant structure, data packets can be transmitted according to source transmitters (e.g., transmitters 71 to 79 and 86 to 89) by the contents of the table registers 52 of the relay transmitters 81, 82, 84, and 85 so that many of them are not relayed only to a certain path.

In the preferred embodiment of the present invention, while a multiplexed signal is transmitted and received between transmitters, the present invention is not limited to this example. It is also applicable to transmitters that constitute a network to which multiplexing protocols do not apply.

While the present invention has been described with reference to the preferred embodiments thereof, the invention is not to be limited to the details given herein, but may be modified within the scope of the invention hereinafter claimed.

Finally, it is possible to manufacture the transmitter of the present invention by the embodiments disclosed as described above.

What is claimed is:

1. A transmitter in a network where a plurality of transmitters have an individual specific address and are connected through different transmission paths so that a packet with information about a source address is transmitted, said transmitter comprising:
    a plurality of transmission path ports respectively connected to said different transmission paths, each transmission path port being adapted to send said packet to and receive said packet from one of said transmission paths; and
    a relay section relaying the received packet received in one of said transmission path ports to a relay transmission path of said transmission paths by which said received packet reaches its destination;
    wherein said relay section comprises:
    a table storing information about the relay of said received packet to one of said transmission path ports connected to said relay transmission path, correlated with a port identifier of each said transmission path port and the source address of the transmitter that transmitted said packet; and
    a router extracting the port identifier of the transmission path port that received said packet and said source address contained in said received packet, and routing said received packet to one of said transmission path ports, which is connected to said relay transmission path, by referring to said table for said extracted port identifier and source address, wherein said router comprises:
    a receiving port extracting part extracting the receiving port identifier of the transmission path port that received said packet;
    a source address extracting part extracting the source address contained in said received packet; and
    a routing part performing said routing by referring to said table in response to said receiving port identifier extracted by said receiving port extracting part and said source address extracted by said source address extracting part, wherein said routing part comprises:
    a judging part judging whether or not to relay said received packet by referring to said table, based on said receiving port identifier extracted by said receiving port extracting part and said source address extracted by said source address extracting part; and
    an assigning part assigning said received packet to a transmission path port when it is judged by said judging part that said received packet is to be relayed, said assigning part comprising a plurality of transmitting parts each corresponding to a respective one of said transmission path ports,
    said judging part outputs a plurality of judged results for said plurality of transmitting parts, respectively,
    each of said plurality of transmitting parts outputs said received packet to a respective one of said transmission path ports based on a corresponding judged result from said judging part,
    said table stores the information about the relay, such as to relay said received packets when said source address extracted from said received packet designates another transmitter and the other transmitter designated by said source address is located on a path connected to the transmission path port corresponding to the receiving port identifier extracted by said receiving port extracting part, and the information about the relay such as not to relay said received packet when said source address extracted from said received packet designates the transmitter or the other transmitter designated by said source address is located on another path other than the path connected to the transmission path port corresponding to the receiving port identifier extracted by said receiving port extracting part,
    said judging part judges to relay or not to relay said received packet according to the information about the relay stored in said table.

2. The transmitter as set forth in claim 1, wherein, as said information about the relay of said received packet correlated with said receiving port identifier and said source address, said table stores both information that said received packet is not relayed if it circulates within said network, and information that said received packet is relayed if it does not circulate within said network.

3. The transmitter as set forth in claim 2, wherein said network has a mesh path or ring path through which said received packet can circulate.

4. The transmitter as set forth in claim 1, wherein in the case where a path to a destination transmitter is divided into a plurality of paths and has a redundant structure,
    when said received packet is routed by said router, transmission path ports to relay said received packet are assigned in said table so that many of them are not relayed only to a specific path forming said redundant structure.

5. A packet transmission method for a network where transmitters with an individual address are connected through different transmission paths so that a packet with information about the address of a source transmitter is transmitted from the source transmitter to a destination transmitter, in a relay transmitter between said source transmitter and said destination transmitter, said method comprising a port extracting step of extracting the receiving port identifier in a packet received through said transmission path, an address extracting step of extracting a source address contained in said received packet, and a routing step of routing said received packet, based on said extracted receiving port identifier and said extracted source address, wherein said routing step comprises:

a judgment step of judging whether or not to relay said received packet for each of a plurality of transmission paths, based on said extracted port identifier and said extracted source address, said judging being performed by referring to a table storing information about the relay of the received packet to one of said transmission paths; and an assignment step in which, when it is judged in said judgment step that said received packet is to be relayed, said received packet is assigned to a transmission port corresponding to one of said plurality of transmission paths, and when it is judged in said judgment step that said received packet is not to be relayed, information that said received packet is not relayed is issued and said received packet is not assigned to a correlated transmission port corresponding to another of said plurality of transmission paths, and said table stores the information about the relay, such as to relay said received packets when said source address extracted from said received packet designates another transmitter and the other transmitter designated by said source address is located on a path connected to a transmission path port corresponding to an extracted receiving port identifier, and the information about the relay such as not to relay said received packet when said source address extracted from said received packet designates the transmitter or the other transmitter designated by said source address is located on another path other than the path connected to the transmission path port corresponding to the extracted receiving port identifier, said judgment step judging to relay or not to relay said received packet according to the information about the relay stored in said table.

* * * * *